United States Patent [19]

Karow

[11] Patent Number: 4,887,797

[45] Date of Patent: Dec. 19, 1989

[54] SLAG FLUSHING AND WATER LEVEL CONTROL SYSTEM FOR A METAL CUTTING APPARATUS

[75] Inventor: Gerald D. Karow, Bayside, Wis.

[73] Assignee: Messer Griesheim Industries, Inc., Valley Forge, Pa.

[21] Appl. No.: 279,543

[22] Filed: Dec. 5, 1988

[51] Int. Cl.$^4$ .............................................. B23K 7/08
[52] U.S. Cl. ...................................... 266/49; 148/9 R
[58] Field of Search .................... 266/48, 49; 148/9 R

[56] References Cited

U.S. PATENT DOCUMENTS

| | | | |
|---|---|---|---|
| 3,486,744 | 12/1969 | Beyers et al. | 266/49 |
| 3,743,260 | 7/1973 | Alleman et al. | 266/49 |
| 3,792,846 | 2/1974 | Geffert | 148/9 R |

Primary Examiner—S. Kastler

Attorney, Agent, or Firm—Andrus, Sceales, Starke & Sawall

[57] ABSTRACT

A slag flushing and water level control system for the burn tank of a metal cutting apparatus utilizes a pair of separate water displacement chambers disposed in the tank below an inclined slag-collecting intermediate floor section. Water is displaced from one chamber by compressed air and caused to flow over the upper edge of the inclined floor and cascade downwardly thereover, carrying with it the slag deposited thereon. The water used in flushing the floor is collected in the second displacement chamber and subsequently displaced therefrom by air pressure to fill the burn tank and raise the level therein to a selected operating level. After completion of the cutting operation, sequential relief of the air pressure in the first and second chambers allows appropriate volumes of water to return thereto for a subsequent cycle.

14 Claims, 3 Drawing Sheets

SLAG FLUSHING AND WATER LEVEL CONTROL SYSTEM FOR A METAL CUTTING APPARATUS

BACKGROUND OF THE INVENTION

The present invention relates to an improved apparatus and method for flushing the slag from and controlling the water level of a burn table for a metal cutting apparatus. More particularly, the invention pertains to a system utilizing compressed air to supply water for slag flushing and level control.

Metal cutting apparatus utilizing, for example, gas or plasma cutting torches is well known in the art. Such a metal cutting apparatus typically includes a cutting torch or gang of torches supported on a overhead carriage for programmed cutting movement over a metal workpiece supported on a so called "burn table" positioned below the carriage. The burn table, in turn, is located above a burn tank containing water into which the metal oxide slag, molten metal and small pieces of scrap fall as they are cut from the workpiece. The water level in the burn tank is commonly variable within selected limits to a maximum level in which the burn table and workpiece may be completely submerged for under water cutting. The burn tank also typically includes a downwardly sloping floor or bottom wall onto which the slag falls and moves or is caused to move downwardly for collection at the lower edge and removal.

The prior art discloses a variety of methods and related apparatus for flushing the slag from the sloping floor of a burn tank to a common lower collecting point for removal and disposal. U.S. Pat. No. 3,486,744 (Beyers et al) utilizes a pump to circulate slag flushing water to a trough at the upper edge of the inclined floor portion, from which trough the water overflows down the floor carrying with it the slag particles to a lower collecting trough. The sloping floor portion comprises two identical side floors which slope downwardly from the tank side walls to a common longitudinally-extending collecting trough in the center of the tank. Similarly, U.S. Pat. No. 3,526,395 (Brown) utilizes a recirculating pump to carry water to the upper edge of an inclined floor portion where it flows downwardly over the floor carrying slag particles to a collection point along the opposite side wall of the tank. U.S. Pat. No. 3,792,846 (Geffert) discloses a self-cleaning burn table in which slag is washed from an inclined collecting surface which is maintained under the level of water in the burn tank and from which the slag is washed by high pressure jets of water supplied by a pump to a common header.

In each of the foregoing patents, the water circulation pump may also be utilized to control and vary the level of water in the tank to accommodate various cutting processes. These water flushing, recirculation and level control systems require fairly complex plumbing systems and associated flow controls. In addition, the pumps utilized in these systems are subject to severe wear by the highly abrasive slag particles which are unavoidably circulated through the pump despite protective filters.

U.S. Pat. No. 3,743,260 (Alleman et al) shows a slag collecting tank for a burn table having downwardly sloping floor portions over which the slag moves downwardly for collection in a centrally located trough at the bottom of the tank. Supplemental water chambers below the sloping floor may be pressurized with compressed air over the water level therein to force the water into the main tank portion above the sloping floor to establish variable selected water levels in the burn tank, as may be desired. No particular means for flushing the slag from the inclined floor surface is disclosed beyond the relatively steep slope thereof to facilitate the downward movement of slag by gravity. The steep slope of the inclined floor portion requires a relatively deeper burn tank than might normally be required. U.S. Pat. No. 4,162,060 (Anderson et al) shows a burn tank in which compressed air is utilized to vary the water level in the tank as desired. However, collection of the slag from the burning process is accommodated by upwardly tilting slag-collecting subfloor portions to dump the slag thereon nto collecting bins disposed at the side of the tank. Such a slag collecting apparatus is fairly cumbersome and mechanically complex.

SUMMARY OF THE INVENTION

In accordance with the present invention, slag flushing from the burn table of a metal cutting apparatus is provided by the controlled movement of water over the inclined collecting surface by forcing the water from a reservoir or displacement chamber with a source of pressurized gas. Gas pressure is also utilized to control the water level in the burn tank. The system requires no pumping or recirculation of water through a pump or associated water flow control means. The reverse flow of water in the system is simply accommodated by gas pressure relief.

In accordance with the present invention, a downwardly sloping intermediate floor portion is disposed in the burn tank to receive slag falling from the burn table disposed above it. The sloping floor portion has an upper edge disposed below the upper tank edge and a lower edge terminating near the bottom of the tank. A first water displacement chamber below the downwardly sloping floor portion has a water opening near the bottom thereof which is connected to the upper edge of the inclined floor. The first displacement chamber also has an upper gas opening above the water opening connected to a source of pressurized gas. A second displacement chamber is also disposed below the sloping floor portion and is similarly provided with a lower water opening or passage and an upper gas opening, the latter also connected to a source of pressurized gas. The water passage in the second displacement chamber is located below the lower edge of the inclined floor portion.

In operation, water is forced out of the first displacement chamber by pressurizing the interior of the reservoir above the level of water therein and causing the water to move upwardly and over the upper edge of the inclined floor portion, carrying with it the slag deposited thereon. The slag flushed from the inclined floor falls off the lower edge thereof into a collecting trough while the water flows into the second displacement chamber via the lower water passage. While the gas pressure is maintained in the first displacement chamber, the second chamber is also pressurized, thereby forcing the water back out through the water passage and into the burn tank to fill the tank to an operating level above the inclined floor portion.

Subsequent sequential relief of the gas pressure in the first and second chambers, respectively, causes the water in the burn tank to automatically flow back into the chambers to their original levels.

Control of this slag flushing process and water level adjustment requires only a series of air valves in an air supply header, including an appropriate exhaust relief valves. The control may be operated in a manual or an automatic mode to provide the convenience and benefits of the cascade rinse process, but avoiding the costs and maintenance problems associated with systems utilizing motor-driven water pumps. Level control switches, such as float switches, may be utilized to provide automatic operation of the process.

DETAILED DESCRIPTION OF THE PREFERRED EMBODIMENT

Figure 1:
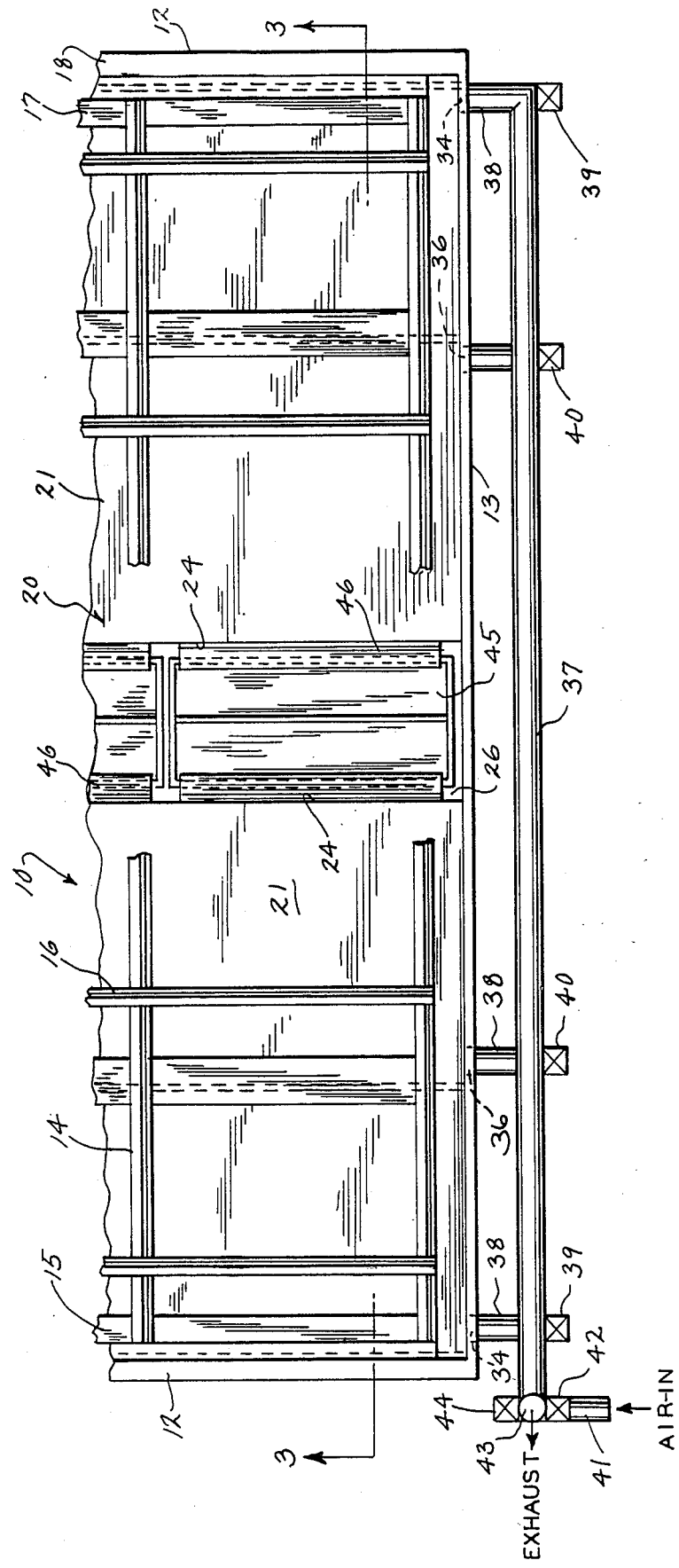
FIG. 1 is a top plan view of a burn table and underlying burn tank incorporating the system of the present invention, with portions of the burn table cut away.
Figure 2:
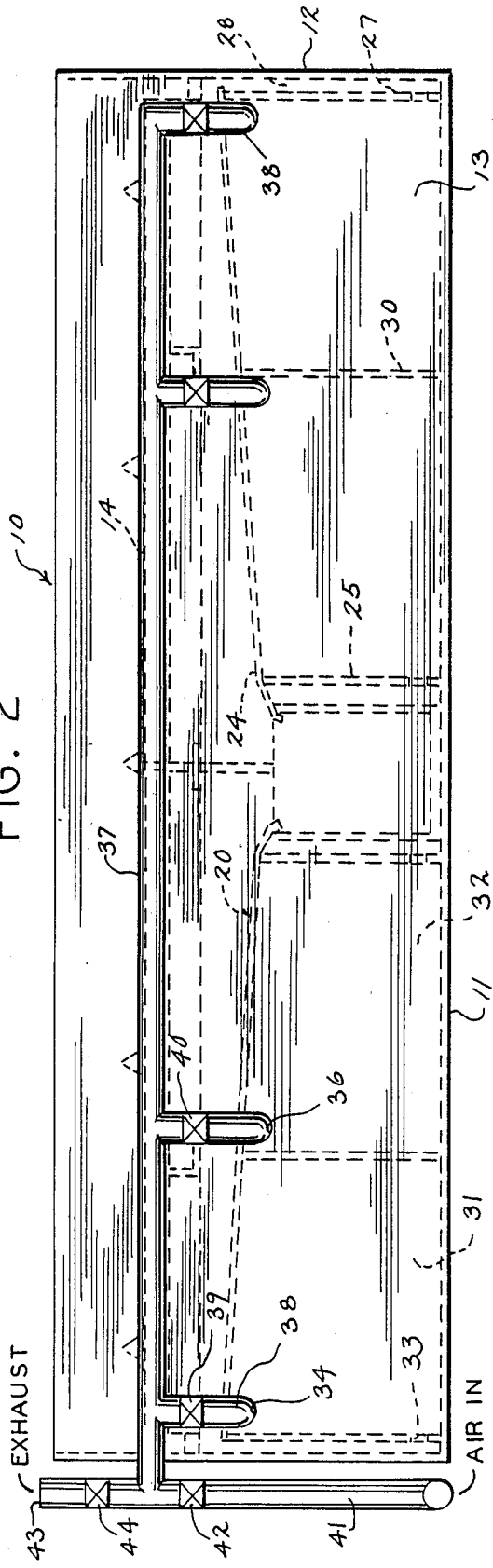
FIG. 2 is an end elevation of the burn tank shown in FIG. 1.
Figure 3:
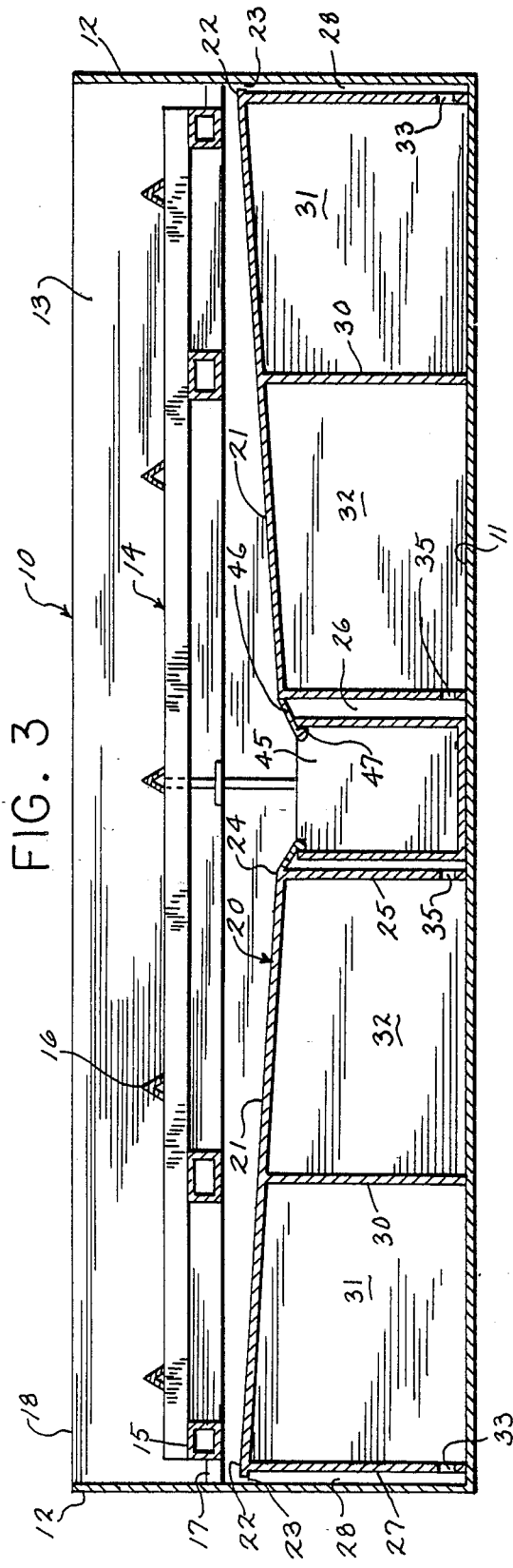
FIG. 3 is a vertical section taken on line 3—3 of FIG. 1.

A burn tank 10 is of generally rectangular configuration and includes a flat bottom and vertically disposed side walls 12 and end walls 13. A burn table 14 is disposed in the upper portion of the burn tank 10 and includes a peripheral side frame 15 to the upper edge of which is attached a workpiece-supporting gridwork 16 upon which a steel plate or other workpiece is placed for cutting. In a typical installation, an overhead bridge, spanning the burn tank, supports the carriage and cutting torches for programmed cutting movement just above the workpiece lying on the gridwork 16. The bridge, carriage and torch mechanism may be of any conventional construction and, therefore, are not shown.

The side frame 15 of the burn table 14 may be carried by a supporting platform 17 extending around the inside of the walls 12 and 13 of the burn tank 10. The supporting platform 17 is disposed far enough below the upper edge 18 of the tank so that, if desired, the tank may be filled with water to a level which will completely submerge the burn table 14. This is to enable the burn tank to be utilized with cutting systems employing underwater cutting, such as plasma arc torch systems.

As the steel workpiece supported by the gridwork 16 is being cut, molten metal particles, metal oxide slag, and other small pieces of metal will fall onto a downwardly sloping intermediate floor portion 20 disposed below the side frame 15 of the burn table 14 and extending the full length of the side walls 12 of the tank. Preferably, the floor portion 20 comprises two identical sections 21 each extending generally from one side wall 12 downwardly toward the longitudinal centerline of the tank. The upper edge 22 of each floor section 21 terminates below the burn table and spaced from the side wall 12 of the tank such that the edge 22 and the inside surface of the side wall 12 define a longitudinal slot 23 extending between the end walls 13 along the full length of the tank. The lower edge 24 of each floor section 21 terminates a substantial distance above the bottom 11 of the burn tank and short of the longitudinal centerline of the tank. The lower edge of each floor section is attached to a vertically disposed center plate 25 which extends downwardly to the bottom of the tank and longitudinally the full length of the tank between the end walls 13 to form a slag trough 26.

The upper edge 22 of each floor section 21 is attached to and supported by a side plate 27 which extends vertically downwardly to the bottom of the tank and longitudinally between the opposite end walls 13. The side plate 27 and the side wall 12 of the tank adjacent thereto form a vertical passage 28 extending from the open slot 23 to the bottom of the tank. As may be seen, a completely enclosed chamber is formed on each side of the slag trough by the tank bottom 11, end walls 13, center and side plates 25 and 27, and upper floor section 21. However, each main chamber is divided by a separating wall 30 extending longitudinally between the end walls 13 and vertically from the underside of the floor section 21 to the bottom of the tank. The separating wall 30 thus divides the tank volume beneath each floor section 21 into a first reservoir or displacement chamber 31 and a second reservoir or displacement chamber 32.

Each first displacement chamber 31 is completely enclosed, except for a lower water passage 33 near the tank bottom and in open communication with the vertical passage 28 to the slot 23, and an upper gas opening 34 in the end wall 13 enclosing one end of the chamber 31. Likewise, the second displacement chamber 32 is completely enclosed, except for a water passage 35 near the tank bottom in open communication with the slag trough 26 and an upper gas opening 36 in the same end wall 13 as the gas opening 34 for the first displacement chamber.

Each of the water passages 33 and 35 may comprise a series of holes in the side plate 27 and center plate 25, respectively, extending the full length of the tank between the end walls. A single hole or fewer holes may also be used, but a full length hole pattern will better accommodate the large volume flow of water to be described hereinafter.

An air supply header 37 is mounted along the outside of end wall 13 and includes an air supply leg 38 connecting the header to each gas opening 34 and 36. Each air supply leg 38 includes a solenoid-operated air valve 39 or 40 for each displacement chamber 31 or 32, respectively. An air supply main 41 is connected to one end of the header 37 for the controlled supply of compressed air via a solenoid-operated supply valve 42. The air supply main 41 also includes an exhaust opening 43 in communication with the open end of the air supply header 37 and controlled by a solenoid-operated exhaust valve 44.

A series of removable slag buckets 45 are placed in the slag trough 26 along the length thereof. Each slag bucket 45 is somewhat narrower than the width of the slag trough 26 such that there is an unobstructed opening for the flow of water between each side of the bucket and the center plate 25 adjacent thereto. The slag accumulating on the floor sections 21 comprising the intermediate floor portion 20 is flushed downwardly toward the slag trough 26 and, as the slag passes over the lower edges 24 of the floor sections 21, the slag falls into and is collected in the slag buckets 45, the upper edges of which are disposed just below the lower edges of the downwardly inclined floor sections 21. To facilitate the flow of slag from the floor sections into the slag buckets, each slag bucket has a wing plate 46 pivotally attached to its upper longitudinal edge to bridge the gap between the bucket and the floor section to provide a surface over which the slag may be flushed into the bucket. The pivotal connection between each wing plate 46 and the upper edge of the bucket 45 may comprise a hinge of any suitable type.

Referring also to FIGS. 4A–E, the method of operation of the slag flushing and level control system will be described. Although the sequence of use in FIGS. 4A–E shows only vertical half sections of the tank, it is understood, of course, that the system is preferably completely symmetrical and the flow of water with respect to identical components is simultaneously the same on both sides of the tank.

Figure 4A:
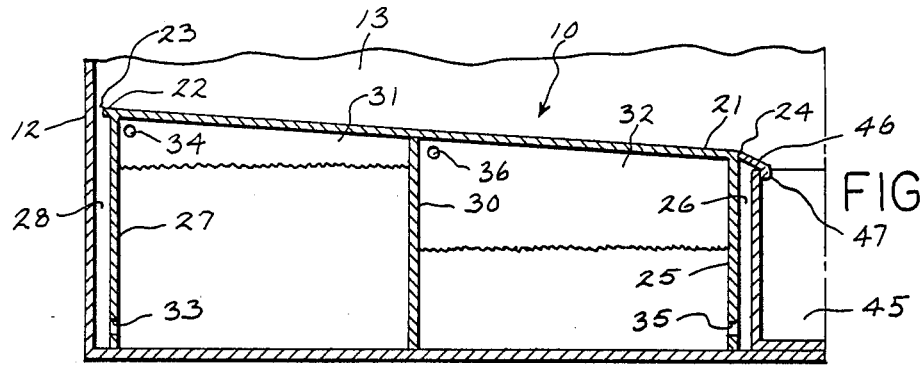
FIGS. 4A-E are vertical half sections, similar to FIG. 3, showing schematically the sequential change in water levels over the operational cycle of the system of the present invention.

Referring first to FIG. 4A, the system is shown at its initial stage of operation. This initial stage may be immediately after a cutting operation and, therefore, the inclined surface of the floor section 21 may have a layer of slag deposited thereon. The first displacement chamber 31 and the adjacent vertical passage 28 are filled to a relatively high level, representative generally of the maximum level of water typically contained in chamber 31. In the second displacement chamber 32 and the adjoining slag trough 26, the water is at an intermediate level somewhere between the maximum upper and lower levels utilized over a normal operating cycle.

Figure 4B:
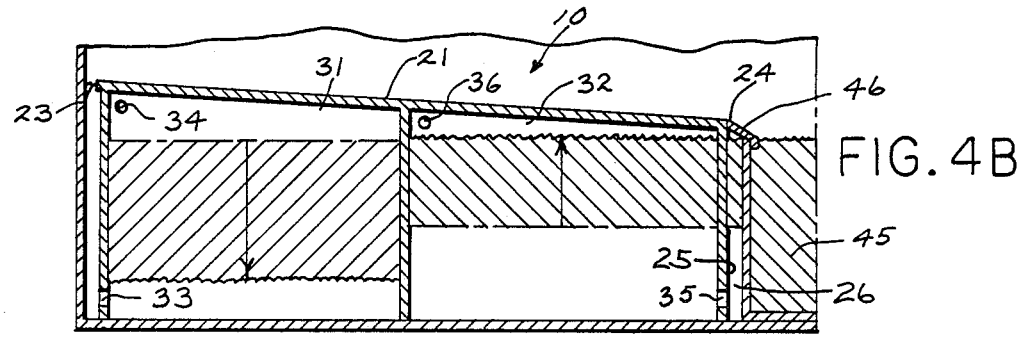

Referring to FIG. 4B, the slag flushing step is commenced by closing the air valve 40 to gas opening 36 in the second displacement chamber 32 and the exhaust valve 44, and opening the air valve 39 to gas opening 34 in displacement chamber 31 and the air supply valve 42 from the source of compressed air. Compressed air will enter chamber 31 via opening 34 and, as the air pressure above the level of the water increases, the water will be displaced downwardly and caused to flow out of the water passage 33, upwardly through the slot 23 and over the upper edge 22 of the floor section 21. The water displaced over the upper edge 22 will cascade downwardly over the surface of the floor section 21 carrying with it the slag deposited thereon. The volume of compressed air admitted into the first displacement chamber 31 is continued until sufficient water is displaced from the chamber so that the water level is just above the water passage 33. Simultaneously, the water cascading down the floor section 21 flows through gaps in or past the edges of the wing plates 46 through the space between the slag buckets 45 and the center plate 25 and into the second displacement chamber 32 via the water passage 35. The slag buckets may also fill with water, as shown in FIG. 4B. The volume of water displaced from the first displacement chamber 31 is sufficient to raise the water level in the second displacement chamber 32 and the slag trough 26 to approximately the lower edge 24 of the floor section 21. The dashed lines in FIG. 4B represent the original water levels in FIG. 4A and the arrows represent the direction of movement of the water levels from FIGS. 4A to 4B. The oppositely cross hatched areas between the water levels are, in the rectangular tank shown, directly proportional to the volume of water transferred and, therefore, approximately equal.

Figure 4C:
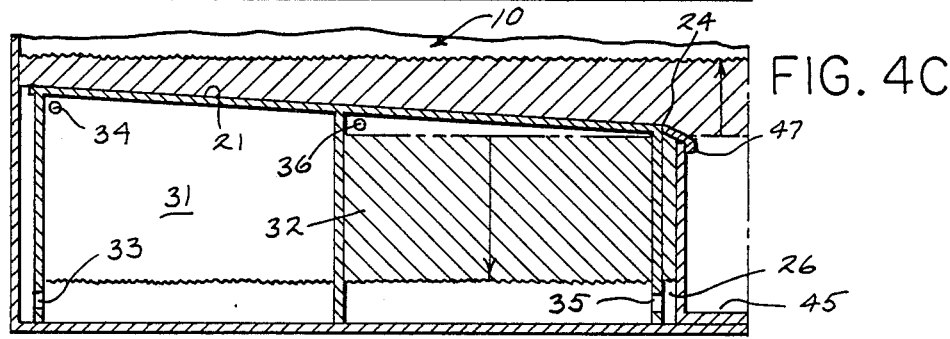

FIG. 4C shows the next succeeding step by which water is displaced from the second displacement chamber 32 to fill the burn tank 10 to a desired level. The water level in the burn tank may be established anywhere up to a maximum level in which the burn table 14 and workpiece thereon are completely submerged for underwater cutting. With the first air valve 39 closed to maintain the pressure in displacement chamber 31 and thus the low water level therein, the second air valve 40 is opened and compressed air is admitted to the second displacement chamber 32 via supply leg 38 and gas opening 36. Air pressure above the level of the water in the second displacement chamber 32 forces the water out through water passage 35, raising the level in the tank from the lower edge 24 of the floor section 21 to the desired upper level shown. The dashed lines in FIG. 4C represent the water levels shown in FIG. 4B and the arrows indicate the direction of movement of the changing water levels under the influence of the air pressure in displacement chamber 32. Water is displaced from chamber 32 until the level therein is just above the water passage 35, whereupon the air valve 40 may be closed to maintain the pressure and thus the lower water level therein. As with FIG. 4B, the oppositely cross hatched portions of FIG. 4C are directly proportional to the volume of water displaced from chamber 32 into the tank 10 and, therefore, substantially equal.

Depending on the vertical position of the upper edges of the slag buckets 45 and the water level in the slag trough 26 after the initial displacement of water from chamber 31 (FIG. 4B), the slag buckets may be filled with water. If not, however, the subsequent displacement of water from chamber 32 (FIG. 4C) will, as the level rises above the slag trough, cause the buckets to be filled.

Figure 4D:
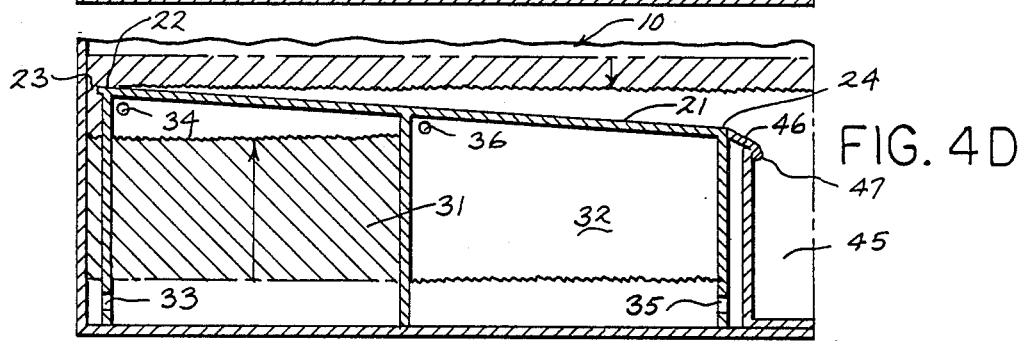

After the cutting operation is completed, the air pressure heads in the displacement chambers 31 and 32 are sequentially relieved and the water in the burn tank is allowed to flow under head pressure back into the displacement chambers. Referring first to FIG. 4D, with the air supply valve 42 closed, exhaust valve 44 and air valve 39 to the first displacement chamber 31 are opened and the pressure therein is relieved. The water in the tank from the upper level shown in FIG. 4C will flow downwardly through the slot 23, and into the displacement chamber 31 via the lower water passage 33 until the water level in the burn tank reaches the upper edge 22 of the floor section 21. Each of the displacement chambers is appropriately sized and the slope of the floor section 21 chosen such that the volume of water readmitted into the chamber 31 is substantially equal to that originally displaced therefrom (in FIG. 4B). As with the two preceding Figures, the oppositely cross hatched sections in FIG. 4D represent the movement of equal volumes of water in the directions indicated by the arrows from the original levels represented by the dash lines to the final levels shown.

Figure 4E:
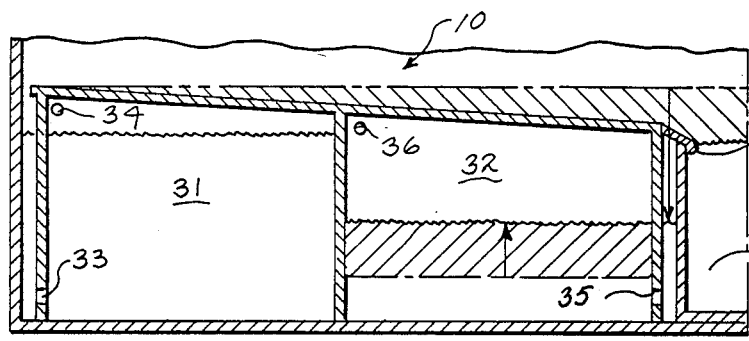

As is shown in FIG. 4E, the air valve 40 maintaining the air pressure in the second displacement chamber 32 is now opened and the compressed air therein is exhausted through the exhaust opening 43 via the open exhaust valve 44. Release of the air pressure in chamber 32 will allow water to flow into the chamber via the passage 35 until the water level in the chamber and adjacent slag trough 26 is stabilized at the original level shown, corresponding to the original level in FIG. 4A. Again, with proper chamber sizing and appropriate selection of the slope of the floor section 21, the volume of water returned to the chamber 32 will re-establish the water level therein to approximately its original level.

In addition, a supplemental flushing action is provided as the water level drops along the floor section 21 from the FIG. 4D level to the FIG. 4E level, carrying additional slag into the slag buckets 45. The slag buckets 45 will be filled with water to their upper edges, as shown, and depending on the initial level of water in the slag buckets in FIG. 4A as well as the additional volume flowing into the buckets during the cascade flushing step in FIG. 4B, some volume of makeup water may have to be added to the tank.

The slag flushing and level control process described hereinabove may be performed under the manual control of the operator or may be controlled automatically. Automatic control may be provided via appropriate programming and use of the same microprocessor typically used to perform programmed cutting of the workpieces on the cutting table. Conventional water level sensing switches, such as float switches, may be utilized to accurately control the operation of the various solenoid operated air valves. Most importantly, however, the use of motor operated water pumps and related water flow control devices is eliminated.

I claim:

1. An improved slag flushing and water level control system for the burn table of a metal cutting apparatus comprising:
   a burn tank disposed below the metal cutting apparatus;
   said burn tank having a bottom and an enclosing side wall effective to retain a varying volume of water at selected levels;
   a downwardly sloping intermediate floor portion in said tank disposed to receive metal slag from the burn table and having a lower edge terminating above the tank bottom and an upper edge terminating below the maximum selected water level;
   a first enclosed water chamber below said intermediate floor portion having a first water passage disposed near the bottom thereof and a first gas opening disposed above said first water passage;
   said first water passage having an open connection to the upper edge of said floor portion;
   said first gas opening having a fluid connection to a source of pressurized gas;
   a second enclosed water chamber below said intermediate floor portion having a second water passage disposed near the bottom thereof and a second gas opening disposed above said second water passage;
   said second water passage having an open connection to the lower edge of said floor portion;
   said second gas opening having a fluid connection to said source of pressurized gas;
   control means for directing gas from said source to said first gas opening to pressurize said first chamber and force the water therefrom over the upper edge of said floor portion; and
   said control means being further operative for directing gas from said source to said second gas opening to pressurize said second chamber and force the water therefrom into said tank to raise the water to a selected level.

2. The system as set forth in claim 1 wherein said first and second chambers are disposed inside said burn tank.

3. The system as set forth in claim 2 wherein said chambers share a common upper enclosing wall.

4. The system as set forth in claim 3 wherein said common upper wall comprises said intermediate floor portion.

5. The system as set forth in claim 4 wherein the bottom of each of said chambers is integral with the bottom of said burn tank.

6. The system as set forth in claim 1 wherein said first chamber includes a side wall disposed spaced from the side wall of the tank to define therewith the open connection between said first water passage and the upper edge of said floor portion.

7. The system as set forth in claim 1 wherein said burn tank is rectangular and further comprising:
   a pair of first and second chambers disposed on opposite sides of the longitudinal centerline of the tank, said second chambers diposed directly opposite each other and defining therebetween a longitudinal slag trough at the bottom of the tank.

8. An improved slag flushing and water level control system for the burn table of a metal cutting apparatus comprising:
   a generally rectangular burn tank disposed below the metal cutting apparatus, said tank including a bottom and generally vertical side walls defining an upper tank edge;
   a downwardly sloping intermediate floor portion in said tank disposed to receive metal slag from the burn table, said floor portion having an upper edge terminating below the upper tank edge and spaced from one side wall of the tank, and a lower edge terminating above the tank bottom;
   a first water displacement chamber in said tank below said floor portion, said first chamber having a first water passage near the bottom thereof in communication with the upper edge of said floor portion, and a first gas opening disposed above said first water passage and having a fluid connection to a source of pressurized gas;
   a second water displacement chamber in said tank below said floor portion, said second chamber having a second water passage near the bottom thereof in communication with the interior of the tank below the lower edge of said floor portion, and a second gas opening disposed above said second water passage and having a fluid connection to said source of pressurized gas;
   control means for directing gas from said source into said first gas opening to pressurize said first chamber and force the water therefrom over the upper edge of said floor portion; and
   said control means being further operative for directing gas from said source into said second gas opening to pressurize said second chamber and force the water therefrom into said tank.

9. The system as set forth in claim 8 wherein said control means is further operative for sequentially relieving the gas pressure in said first and second displacement chambers.

10. A method for flushing slag from the floor and for controlling the level of water in the tank of a metal cutting apparatus including a burn tank disposed below the cutting apparatus, an inclined slag-receiving floor within the tank, and first and second water displacement chambers beneath the floor, said method water in the tank, comprising the steps of:
   pressurizing the interior of the first displacement chamber above the level of water therein to a pressure sufficient to displace a first volume of water from the first chamber;
   directing the water displaced from the first chamber to the upper edge of the floor and causing the water to run downwardly over the floor to flush the slag thereon to the bottom of the tank;
   collecting a major portion of said first water volume in the second displacement chamber;
   pressurizing the interior of the second displacement chamber above the level of water therein to a pressure sufficient to displace a second volume of water therefrom;

directing the water displaced from the second chamber to the tank and causing the water level in the tank to rise to an upper cutting level above the upper edge of the floor;

relieving the pressure in the first chamber and causing a third volume of water to return from the tank to the first chamber; and, relieving the pressure in the second chamber and causing a fourth volume of water to return from the tank to the second chamber.

11. The method as set forth in claim 10 wherein said first and third water volumes are substantially equal.

12. The method as set forth in claim 11 wherein said second water volume is approximately equal to the sum of said third and fourth water volumes.

13. The method as set forth in claim 12 including the step of collecting the slag flushed to the bottom of the tank.

14. The method as set forth in claim 10 including the initial step of providing the second displacement chamber with an initial volume of water not less than said fourth volume.

* * * * *